Sept. 18, 1956     C. J. G. LEESEMANN     2,763,593
SWEETENING OF HYDROCARBONS BY REACTING OLEFINS WITH
MERCAPTANS IN THE PRESENCE OF ACTINIC LIGHT
AND THEN TREATING WITH A HYPOCHLORITE
Filed Aug. 19, 1954
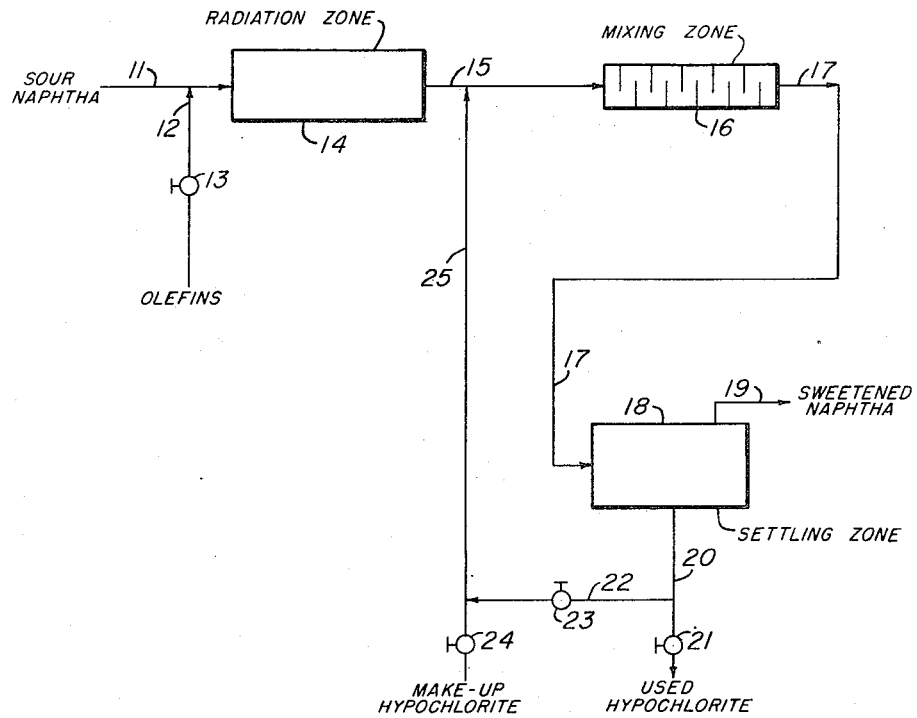
INVENTOR.
Charles J. G. Leesemann,
BY
ATTORNEY

United States Patent Office 2,763,593
Patented Sept. 18, 1956

2,763,593

SWEETENING OF HYDROCARBONS BY REACTING OLEFINS WITH MERCAPTANS IN THE PRESENCE OF ACTINIC LIGHT AND THEN TREATING WITH A HYPOCHLORITE

Charles J. G. Leesemann, Baytown, Tex., assignor, by mesne assignments, to Esso Research and Engineering Company, Elizabeth, N. J., a corporation of Delaware Application August 19, 1954, Serial No. 450,922

13 Claims. (Cl. 196—29)

The present invention is directed to sweetening of hydrocarbons. More particularly, it is directed to sweetening of sour naphthas and the like. In its more specific aspects, the invention is directed to a method for removing reactive mercaptans prior to charging a sour olefin-containing fraction to a hypochlorite sweetening operation.

The present invention may be briefly described as a method for treating hydrocarbons which comprises exposing a sour hydrocarbon fraction which may contain normal, primary, secondary and tertiary mercaptans and olefins to light radiation at a reaction temperature to remove at least the greater portion of tertiary mercaptans by reaction with the olefins to form thioethers. The exposed hydrocarbon is then subjected to contact with aqueous alkaline hypochlorite solution to remove substantially the remaining mercaptans and then sweeten the exposed fraction.

The hydrocarbon employed as a feed stock in the present invention may be a virgin fraction from crude petroleum, such as virgin naphtha, or may be a cracked product either from thermal or catalytic cracking operations. It is desirable and in most instances important in the present invention, that the sour fraction, whether it be a virgin naphtha or a cracked naphtha, contain at least a stoichiometric equivalent amount of olefins to react with the tertiary mercaptans which react with hypochlorite solution to form undesirable acidic, chlorine-containing products.

Mercaptans present in sour cracked and sour virgin naphthas usually comprise the normal, primary, secondary and tertiary mercaptans and may include mercaptans having from about 1 to about 12 carbon atoms in the molecule. These mercaptans may boil in the range from about 45° F. up to about 600° F. or higher depending on the boiling range of the hydrocarbon fraction.

The hydrocarbon fraction, as stated, may be a virgin or a cracked product and may boil in the range between 50° and 750° F. For example, the hydrocarbon may include butanes, pentanes, hexanes, heptanes and the higher members of the homologous series as well as naphthenes, aromatic hydrocarbons, and the like. Gasoline, kerosene, heating oil fractions and the like may be suitably treated in accordance with the present invention.

The light radiation employed in the first step of this invention may be in the range from 1850 A. to 3600 A. and will preferably include radiation having a wave length of about 2537 A. and suitably may be ultra violet radiation from a mercury vapor lamp. The hydrocarbon fraction will suitably be exposed to light radiation at a reaction temperature which may be in the range from about 100° to about 150° F. with a preferred range from 110° to about 140° F.

The hypochlorite solution may be employed to contact the exposed hydrocarbon at a temperature in the range between about 60° and 140° F. with the preferred temperature range between about 80° and 120° F.

The hypochlorite solution is an aqueous alkaline hypochlorite solution which may be calcium hypochlorite or sodium hypochlorite. Preferably the aqueous alkaline hypochlorite solution contains free alkali metal hydroxide in an amount in the range between 50 and 700 grams per liter and preferably obtains free alkali metal hydroxide in this range in excess of 90 grams per liter since alkaline hypochlorite solutions containing excess amounts above 90 grams per liter of free alkali metal hydroxide are non-corrosive to ferrous metals. The alkaline-type solution may contain available chlorine in an amount between 1 and 150 grams per liter but ordinarily will contain an amount in the range between about 1 and 50 grams per liter with satisfactory results being obtained with available chlorine in an amount between 3 and 5 grams per liter.

The present invention will be further illustrated by reference to the drawing in which the single figure is a flow diagram of the preferred mode.

Referring now to the drawing, numeral 11 designates a feed line through which a sour naphtha, which may be a virgin petroleum fraction, is introduced into a system from a source not shown. This sour naphtha may contain normal, primary, secondary, and tertiary mercaptans and preferably has been prewashed with an aqueous caustic solution to remove hydrogen sulfide. There is added to the sour naphtha in line 11 by way of line 12 controlled by valve 13 at least a stoichiometric equivalent of olefins to react with the tertiary mercaptans in the sour naphtha. The naphtha containing olefins is then charged by line 11 into a radiation zone 14 which suitably may include an elongated vessel concentrically arranged around one or more mercury vapor lamps, each having a wattage between 15 and 30 watts. Other arrangements of reaction vessels, known to the art, may be suitably employed. The reaction zone 14 may be of sufficient capacity to provide a residence time in the range from about 1 minute to about 120 minutes with a preferred range from about 15 to about 60 minutes to cause reaction between the more reactive mercaptans and the olefins. During the travel of the feed stock through the zone 14, the olefins and reactive mercaptans react to form thioethers. The exposed hydrocarbon is discharged from zone 14 by line 15 and is admixed with an aqueous alkaline hypochlorite solution introduced into line 15 by line 25 from a source which will be described further. The exposed hydrocarbon and aqueous hypochlorite solution then discharged by line 15 into a mixing zone, such as 16, which may be a baffle-type incorporator, a centrifugal pump, a countercurrent mixing tower or the like, to insure intimate contact between the exposed hydrocarbon now containing the less reactive mercaptans and the aqueous hypochlorite solution. The admixture then discharges from zone 16 by line 17 and is introduced thereby into a settling zone 18 which is of capacity and residence time sufficient to allow gravity separation between the hydrocarbon which has been exposed to light radiation and then contacted with hypochlorite solution and the aqueous solution. The sweetened naphtha is removed from zone 18 by line 19 and may be suitably distilled, as desired, to remove those thioethers which are of higher boiling range than the naphtha and other reaction products.

The separated hypochlorite solution is withdrawn from zone 18 by line 20 and a portion thereof may be discharged from the system by opening valve 21. The greater portion or all of the withdrawn hypochlorite solution is recycled from line 20 to line 16 by branch line 22 controlled by valve 23.

When hypochlorite solution is discharged by line 20 by valve 21, make-up hypochlorite is introduced into line 15 by opening valve 24 in line 16 which connects to a source of make-up hypochlorite, not shown.

It will be seen from the foregoing description taken with the drawing that there is provided a simple combination of steps where undesirably hypochlorite reactive mercaptans are removed from a feed stock to a hypochlorite treating operation.

The present invention may also be suitably employed to remove small concentrations of olefins from substantially pure non-olefinic hydrocarbon solvents, such as pure aromatic, naphthenic, or paraffinic solvents, which may be either pure compounds or compounds of a certain boiling range, for example, normal hexane, cyclohexane, benzene, or toluene, or, for example, mixed xylenes or mixed paraffins. Such solvent fractions recovered in refinery operations, often contain small amounts of olefins not exceeding 1% which are highly objectionable in the finished product. In accordance with the present invention, the olefins are removed by adding to the solvent fraction at least a stoichiometric quantity of mercaptans such as the previously described normal, primary, secondary, and tertiary mercaptans having from about 1 to about 12 carbon atoms in the molecule. These mercaptans may be added as pure compounds or in concentrated solution in a portion of the finished solvent. The admixture is then exposed to ultraviolet radiation as previously described and in this manner the olefins are quantitatively reacted with the mercaptans present. The residual mercaptans and the thioethers formed in the reaction may then be removed from the effluent from the radiation zone by exposing the mixture to sweetening with hypochlorite solution as previously described, or by other means as previously described, and by rerunning, or by other means as desired.

The invention will be further illustrated by the following examples:

A cracked naphtha fraction having a bromine number of 71.6 was washed with caustic to remove hydrogen sulfide and then stored under a nitrogen blanket. After caustic washing, the cracked naphtha had a copper number of 29.5. This cracked naphtha was then exposed to light radiation from a 15-watt mercury lamp for 40 minutes at a temperature from 75° to 95° F. after which the copper number was found to be 24.

In another operation, 1200 volumes of caustic washed stock such as used in the first run was charged into a reaction vessel surrounding a 30-watt mercury lamp. Nitrogen was bubbled through the naphtha to agitate same and samples of the exposed naphtha were withdrawn at intervals for determination of copper number. The copper number at the beginning of the operation was found to be 28 and after 30 minutes dropped off to 24.3, after 70 minutes to 19.2, and after 120 minutes had dropped down to 15. The temperature at the beginning of the run was 80° F. and at the end of run 108° F.

A run similar to the second run was made with the same charge stock having a 28 copper number without exposing the reaction vessel contents to light radiation. Throughout a period of 120 minutes the copper number remained constant at 28.

These results show that irradiation from a mercury vapor lamp causes sweetening according to the reaction:

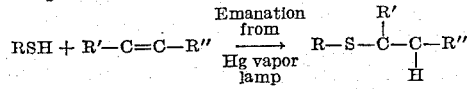

It is believed that the mercaptans removed, as reflected by the decrease in copper number were the more reactive mercaptans, especially the tertiary mercaptans, which ordinarily react with hypochlorite solution to form acidic side reaction products, such as sulfonyl chlorides and the like instead of the desired thioethers.

Other runs were then made in which solutions of butyl mercaptans in normal heptane to which octene-1 was added were irradiated with ultra violet light from a 15-watt mercury lamp with nitrogen being bubbled through the hydrocarbon solution during the irradiation. The results of these runs with normal butyl and tertiary butyl mercaptans after irradiation for periods of time up to 90 minutes are shown in the following table in which a comparision is made with runs without radiation.

Table I

[Bromine No. = 10 (approx.).]
WITH RADIATION

| N-Butyl Mercaptan | | | t-Butyl Mercaptan | | |
| --- | --- | --- | --- | --- | --- |
| Mins. | Temp., °F. | Copper No. | Mins. | Temp., °F. | Copper No. |
| 0 | 76 | 33.4 | 0 | 95 | 35.5 |
| 30 | 103 | 3.2 | 5 | 99 | 32.3 |
| 60 | 111 | 1.6 | 15 | 106 | 16.6 |
| 90 | 112 | 0.7 | 30 | 110 | 6.9 |
| | | | 60 | 114 | 1.9 |
| | | | 90 | 113 | 1.6 |

WITHOUT RADIATION

| Mins. | Temp., °F. | Copper No. |
| --- | --- | --- |
| 0 | 113 | 33.4 |
| 30 | 93 | 32.0 |

Similar runs were made with a solution of butyl mercaptan in normal heptane where the octene-1 was omitted. The results of these runs are presented in Table II:

Table II

[Solutions containing no octene-1 (Br No. = 0).]
WITH RADIATION

| N-Butyl Mercaptan | | | t-Butyl Mercaptan | | |
| --- | --- | --- | --- | --- | --- |
| Mins. | Temp., °F. | Copper No. | Mins. | Temp., °F. | Copper No. |
| 0 | 78 | 40.8 | 0 | 81 | 47.3 |
| 30 | 108 | 30.4 | 30 | 100 | 32.6 |
| 60 | 122 | 25.0 | 60 | 107 | 23.7 |
| 90 | 118 | 20.8 | 70 | 108 | 21.0 |
| | | | 90 | 108 | 17.5 |

The solutions employed in the foregoing runs had copper numbers ranging from about 35 to about 45 and where the olefin was present as octene-1, the solutions contained 7.2 weight per cent of octene-1 and had a bromine number of approximately 10.

From the data in Tables I and II it is shown that photochemical radiation with ultra violet light is effective in reducing the copper number, especially when olefins are present. Without olefins, a reduction in copper number is effected and it is possible to remove the more reactive mercaptans without adding olefins. While it is contemplated that the invention is operable in the absence of olefins, it is preferred to employ olefin-containing feed stocks.

The data in Table II further show that sweetening occurs when the olefins are absent but at a slower rate than when the olefins are present. In short, the data in Tables I and II show that in the presence of olefins, normal and tertiary butyl mercaptans are readily sweetened (90% and 80%, respectively in 30 minutes) while in the absence of olefins the mercaptans are sweetened but at a slower rate (25% and 30%, respectively, in 30 minutes).

While the olefins may be used in excess, it is only necessary to blend stoichiometric quantities of the olefins to react with the mercaptans before exposing the mixture to mercury vapor lamp emanation. The olefin may be added as a pure olefinic hydrocarbon boiling in the range of the feed stock or it may be added as a cracked naphtha in the range indicated which contains the olefins. It will be preferred to charge the olefin as a cracked naphtha for admixture with a virgin naphtha.

The bromine number to which reference has been made is defined as the number of grams of bromine consumed by 100 grams of the sample when reacted under given conditions. It may be determined according to ASTM test No. D1158–52T entitled "Tentative Method of Test for Bromine Number of Petroleum Distillates (Color Indicator Method)" or by ASTM test No. D1159–52T entitled "Tentative Method of Test for Bromine Number of Petroleum Distillates (Electrometric Method)."

The copper number to which reference has been made is determined in accordance with the method described in "U. O. P. Laboratory Test Methods for Petroleum and Its Products," Universal Oil Products Company, Chicago, 1940, page H–61. This test is a measure of the mercaptan sulfur content usually of petroleum distillates, and is equivalent to milligrams of mercaptan sulfur per 100 cc. of the sample tested.

The nature and objects of the present invention having been completely described and illustrated, what I wish to claim as new and useful and to secure by Letters Patent is:

1. A method for treating hydrocarbons which comprises exposing a hydrocarbon fraction containing normal, primary, secondary, and tertiary mercaptan contaminants and olefins to light radiation having a wave length in the range of 1850 to 3600 A° at a reaction temperature of about 100° to about 150° F. for about 1 to 120 minutes to remove at least the major portion of tertiary mercaptans by reaction with said olefins, and then subjecting the exposed hydrocarbon to contact with an aqueous alkaline hypochlorite solution to remove substantially the remaining mercaptans.

2. A method for treating hydrocarbons which comprises exposing a sour olefin-containing hydrocarbon fraction containing mercaptan contaminants reactive with and aqueous alkaline hypochlorite solution to light radiation having a wave length in the range of 1850 to 3600 A° at a reaction temperature of about 100° to 150° F. for about 1 to 120 minutes to react said hypochlorite-reactive mercaptans with said olefin to convert same to disulfides, and then contacting the exposed hydrocarbon fraction with the aqueous alkaline hypochlorite solution to sweeten the exposed fraction.

3. A method in accordance with claim 2 in which the reaction temperature is in the range between about 110° and 140° F. and in which the contact time is in the range of about 15 to 60 minutes.

4. A method in accordance with claim 2 in which the sour olefin-containing hydrocarbon is a sour virgin naphtha to which a stoichiometric amount of olefins has been added to react with the hypochlorite-reactive mercaptans contained therein.

5. A method for treating hydrocarbons which comprises exposing a sour olefin-containing hydrocarbon fraction boiling in the range between 50° and 750° F. containing mercaptan contaminants reactive with an aqueous sodium hypochlorite solution to ultra violet radiation having a wave length in the range of 1850 to 3600 A° at a temperature in the range between 100° and 150° F. for about 1 to 120 minutes to react said hypochlorite-reactive mercaptans with said olefin to convert same to disulfides and then contacting the exposed hydrocarbon fraction with the aqueous solution of sodium hypochlorite solution to sweeten the exposed fraction.

6. A method in accordance with claim 5 in which the exposed fraction is contacted with the sodium hypochlorite solution at a temperature in the range between 60° and 140° F.

7. A method in accordance with claim 5 in which the aqueous sodium hypochlorite solution contains free sodium hydroxide in the range between 50 and 700 grams per liter and available chlorine in the range between 1 and 150 grams per liter.

8. A method for treating hydrocarbons which comprises exposing a hydrocarbon fraction containing normal, primary, secondary and tertiary mercaptan contaminants to light radiation having a wave length in the range of 1850 to 3600 A° at a reaction temperature of about 100° to about 150° F. for about 1 to 120 minutes to remove at least a major portion of tertiary mercaptans by converting same to thioethers, and then subjecting the exposed hydrocarbon to contact with an aqueous alkaline hypochlorite solution to remove substantially the remaining mercaptans.

9. A method for treating hydrocarbons which comprises exposing a sour hydrocarbon fraction containing mercaptan contaminants reactive with an aqueous alkaline hypochlorite solution to light radiation having a wave length in the range of 1850 to 3600 A° at a reaction temperature of about 100° to about 150° F. for about 1 to 120 minutes to convert the hypochlorite reactive mercaptans to thioethers, and then contacting the exposed hydrocarbon fraction with the aqueous alkaline hypochlorite solution to sweeten the exposed fraction.

10. A method in accordance with claim 9 in which the aqueous hypochlorite solution is sodium hypochlorite solution containing free sodium hydroxide in the range between 50 and 700 grams per liter and available chlorine in the range between 1 and 150 grams per liter.

11. A method for treating hydrocarbons which comprises exposing a hydrocarbon fraction containing substantially only one of the hydrocarbon types selected from the group consisting of paraffins, naphthenes, and aromatics, together with an olefin concentration not in excess of 1%, to which has been added a mercaptan selected from the group consisting of the normal, primary, secondary, and tertiary mercaptans having from 1 to about 12 carbon atoms in the molecule in an amount in excess of the stoichiometric equivalent for reaction with said olefins, to light radiation having a wave length in the range of 1850 to 3600 A° at a reaction temperature of about 100° to about 150° F. for about 1 to 120 minutes to react said mercaptans with said olefins to convert same to thioethers and then removing the thioethers and remaining mercaptans from the exposed hydrocarbon fraction.

12. A method for treating hydrocarbons which comprises exposing a hydrocarbon fraction containing substantially only one of the hydrocarbon types selected from the group consisting of paraffins, naphthenes, and aromatics, together with an olefin concentration not in excess of 1%, to which has been added a mercaptan selected from the group consisting of the normal, primary, secondary, and tertiary mercaptans having from 1 to about 12 carbon atoms in the molecule in an amount in excess of the stoichiometric equivalent for reaction with said olefins, to light radiation having a wave length in the range of 1850 to 3600 A° at a reaction temperature of about 100° to about 150° F. for about 1 to 120 minutes to react said mercaptans with said olefins to convert same to thioethers and then contacting the exposed hydrocarbon fraction with aqueous alkaline hypochlorite solution to sweeten the exposed fraction.

13. A method for treating hydrocarbons which comprises exposing a caustic-washed sour olefin-containing hydrocarbon naphtha fraction containing mercaptan contaminants reactive with an aqueous sodium hypochlorite solution to ultra-violet light radiation having a wave length within the range of 1850 to 3600A° at a temperature of about 110° to about 140° F. for about 15 to 60 minutes to react at least a portion of said mercaptans with at least a portion of the olefins contained in said fraction to convert the same to thioethers and then contacting the thus exposed hydrocarbon fraction with an aqueous sodium hypochlorite solution to sweeten the same.

References Cited in the file of this patent

UNITED STATES PATENTS

| | | |
|---|---|---|
| 2,392,294 | Rust et al. | Jan. 1, 1946 |
| 2,626,232 | Love | Jan. 20, 1953 |
| 2,631,121 | Linn et al. | Mar. 10, 1953 |